(12) United States Patent
Lv et al.

(10) Patent No.: US 11,366,788 B2
(45) Date of Patent: Jun. 21, 2022

(54) PARALLEL PIPELINED PROCESSING FOR SNAPSHOT DATA DELETION

(71) Applicant: EMC IP Holding Company LLC, Hopkinton, MA (US)

(72) Inventors: Shuo Lv, Beijing (CN); Ming Zhang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 234 days.

(21) Appl. No.: 16/356,206

(22) Filed: Mar. 18, 2019

(65) Prior Publication Data
US 2019/0384743 A1    Dec. 19, 2019

(30) Foreign Application Priority Data

Jun. 15, 2018 (CN) .......................... 201810623396.3

(51) Int. Cl.
| | |
|---|---|
| *G06F 16/11* | (2019.01) |
| *G06F 9/48* | (2006.01) |
| *G06F 9/38* | (2018.01) |
| *G06F 11/14* | (2006.01) |
| *G06F 16/16* | (2019.01) |
| *G06F 9/50* | (2006.01) |

(52) U.S. Cl.
CPC .............. *G06F 16/128* (2019.01); *G06F 9/38* (2013.01); *G06F 9/48* (2013.01); *G06F 11/1448* (2013.01); *G06F 11/1458* (2013.01); *G06F 16/162* (2019.01); *G06F 9/5066* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 9,400,741 B1 | 7/2016 | Bono et al. | |
| 9,940,331 B1 | 4/2018 | Bono et al. | |
| 10,140,307 B1 | 11/2018 | Armangau et al. | |
| 10,248,336 B1 * | 4/2019 | Koujalagi | ........... G06F 11/1484 |
| 10,503,602 B2 * | 12/2019 | Kashi Visvanathan | ...................... H04L 67/1095 |

(Continued)

OTHER PUBLICATIONS

Dragga et al, GCTrees: Garbage Collecting Snapshots, IEEE, pp. 1-12 (Year: 2015).*

*Primary Examiner* — Abu Zar Ghaffari
(74) *Attorney, Agent, or Firm* — BainwoodHuang (57) ABSTRACT

Techniques delete snapshot data. In accordance with certain techniques, a first sub-process of a snapshot deletion process on a first data block of the snapshot data is performed with a first thread. The snapshot deletion process includes at least the first sub-process and a second sub-process, the first and second sub-processes being performed sequentially. In response to an end of the first sub-process performed with the first thread, the second sub-process on the first data block is performed with the first thread. In parallel with performing, with the first thread, the second sub-process on the first data block, the first sub-process on a second data block of the snapshot data is performed with a second thread different from the first thread, the second data block being different from the first data block. Such techniques improve IO lock contention, system resource utilization rate and parallelism, response time and system overhead.

15 Claims, 6 Drawing Sheets

(56) References Cited

U.S. PATENT DOCUMENTS

| | | | |
|---|---|---|---|
| 10,678,453 B2 | 6/2020 | Zhao et al. | |
| 10,721,141 B1* | 7/2020 | Verma | G06F 11/3006 |
| 2004/0168058 A1* | 8/2004 | Margolus | G06F 16/2358 |
| | | | 713/158 |
| 2006/0206677 A1* | 9/2006 | Kim | G06F 3/0611 |
| | | | 711/162 |
| 2008/0177957 A1* | 7/2008 | Lee | G06F 11/1471 |
| | | | 711/161 |
| 2008/0281875 A1* | 11/2008 | Wayda | G06F 11/1435 |
| 2008/0301203 A1* | 12/2008 | Adkins | G06F 11/1435 |
| 2010/0179959 A1* | 7/2010 | Shoens | G06F 16/128 |
| | | | 707/758 |
| 2011/0258404 A1* | 10/2011 | Arakawa | G06F 3/0608 |
| | | | 711/162 |
| 2013/0282662 A1* | 10/2013 | Kumarasamy | G06F 11/14 |
| | | | 707/649 |
| 2014/0089264 A1* | 3/2014 | Talagala | G06F 3/0616 |
| | | | 707/649 |
| 2014/0149698 A1* | 5/2014 | Ezra | G06F 12/0864 |
| | | | 711/162 |
| 2014/0189270 A1* | 7/2014 | Iwanicki | G06F 16/1752 |
| | | | 711/162 |
| 2015/0358186 A1* | 12/2015 | Sarca | H04L 27/265 |
| | | | 375/232 |
| 2016/0103738 A1* | 4/2016 | Forgette | G06F 11/1484 |
| | | | 707/639 |
| 2016/0335278 A1* | 11/2016 | Tabaaloute | G06F 16/184 |
| 2018/0113625 A1* | 4/2018 | Sancheti | G06F 16/128 |
| 2018/0365109 A1* | 12/2018 | Im | G06F 11/1448 |
| 2021/0133146 A1* | 5/2021 | Zhang | G06F 16/1844 |

* cited by examiner

PARALLEL PIPELINED PROCESSING FOR SNAPSHOT DATA DELETION

CROSS-REFERENCE TO RELATED APPLICATION(S)

This application claims priority to Chinese Patent Application No. CN201810623396.3, on file at the China National Intellectual Property Administration (CNIPA), having a filing date of Jun. 15, 2018, and having "METHOD, DEVICE AND COMPUTER READABLE STORAGE MEDIUM FOR DELETING SNAPSHOT DATA" as a title, the contents and teachings of which are herein incorporated by reference in their entirety.

FIELD

Embodiments of the present disclosure generally relate to computer technology, and more specifically, to a method, a device and a computer readable storage medium for deleting snapshot data.

BACKGROUND

A snapshot technology is a commonly used data protection technology. The term "snapshot" as used herein refers to a fully available copy of a specified data set which includes an image of the corresponding data at a certain point of time (for example, a point of time at which a replication begins). With the snapshot technology, data can be recovered in a case of data corruption or data loss.

A snapshot created for data to be backed up may be stored on a disk. Considering that storing the snapshot consumes a large amount of storage space, normally, it is required that unnecessary snapshots are deleted periodically to reclaim the corresponding space. In a traditional snapshot deletion process, threads are allocated dynamically. For example, one thread is allocated for a deletion of each snapshot data block. These threads are usually executed in parallel, which may result in input and output (IO) lock contention between threads, thus increasing read and write response time and system overheads.

SUMMARY

In general, embodiments of the present disclosure provide a method, device and computer readable storage medium for deleting snapshot data.

In a first aspect, embodiments of the present disclosure provide a method of deleting snapshot data. In this method, a first sub-process of a snapshot deletion process on a first data block of the snapshot data is performed with a first thread. The snapshot deletion process includes at least the first sub-process and a second sub-process, and the first and second sub-processes are performed sequentially. In response to an end of the first sub-process performed with the first thread, the second sub-process on the first data block is performed with the first thread. In parallel with performing, with the first thread, the second sub-process on the first data block, the first sub-process on a second data block of the snapshot data is performed with a second thread different from the first thread, the second data block being different from the first data block.

In a second aspect, embodiments of the present disclosure provide a device for deleting snapshot data. The device includes a processor and a memory storing computer executable instructions which, when executed by the processor, causes the device to perform actions, including: performing, with a first thread, a first sub-process of a snapshot deletion process on a first data block of the snapshot data, the snapshot deletion process including at least the first sub-process and a second sub-process, the first and second sub-processes being performed sequentially; in response to an end of the first sub-process performed with the first thread, performing, with the first thread, the second sub-process on the first data block; and in parallel with performing, with the first thread, the second sub-process on the first data block, performing, with a second thread different from the first thread, the first sub-process on a second data block of the snapshot data, the second data block being different from the first data block.

In a third aspect, embodiments of the present disclosure provide a computer readable storage medium having computer executable instructions stored thereon which, when executed by a processor, causing the processor to perform the method according to the first aspect.

It is to be understood that the content described in the Summary is not intended to identify key features or essential features of the claimed subject matter, nor is it intended to be used to limit the scope of the claimed subject matter. Other features of the present disclosure will be more comprehensible with the following depiction.

BRIEF DESCRIPTION OF THE DRAWINGS

Through the following detailed description with reference to the accompanying drawings, the above and other features, advantages and aspects of embodiments of the present disclosure will become more apparent. In the drawings, the same or similar reference symbols refer to the same or similar elements, in which.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Embodiments of the present disclosure will be described in the following in more details with reference to the drawings. Although some embodiments of the present disclosure are illustrated in the drawings, it is to be understood that the present disclosure may be implemented in various manners and should not be limited to the embodiments illustrated herein. On the contrary, these embodiments are provided to make the present disclosure more thorough and complete. It is to be understood that the drawings of the present disclosure and embodiments thereof are only for the purpose of illustration without suggesting any limitation to the scope of protection of the present disclosure.

As used herein, the term "includes" and its variants are to be read as open-ended terms that mean "includes, but is not limited to". The term "based on" is to be read as "based at least in part on". The term "one embodiment" is to be read as "at least one embodiment"; the term "another embodiment" is to be read as "at least one another embodiment". The following text may also include relevant definitions of other terms.

To improve utilization rate of a storage system, it is generally required to regularly delete unnecessary snapshots so as to reclaim the corresponding storage space. Conventionally, a thread may be allocated to each intermediate block (IB) of snapshot data. A plurality of threads for processing a plurality of IBs may be executed in parallel. For example, a snapshot deletion process may include a series of processing, such as reading intermediate block (IB) data, calculating each snapshot state for each offset, updating a weight value, writing a log, writing dirty metadata and so on. The thread used for each IB may perform this series of processing in parallel.

However, this parallel execution of a plurality of threads is very likely to result in competitive resource lock and would reduce resource utilization rate of IO resources and central processing unit (CPU) resources and increase system overhead. In addition, creating a thread for each IB separately would cause repeated startup and destruction of threads. When LUN capacity reaches a terabyte (TB) level, it would lead to a large amount of thread overhead.

Embodiments of the present disclosure provide a parallel snapshot deletion mechanism based on pipeline scheduling. Based on this mechanism, the snapshot deletion process is divided into a plurality of sub-processes in the order of execution. These sub-processes have certain dependencies. The processing of a sub-process for a section of data can be performed only after the end of a previous sub-process. As such, each sub-process may be seen as a stage of the pipeline. A plurality of threads is allocated for the snapshot deletion process, and each thread performs a different stage of the pipeline. In this way, IO lock contention can be reduced significantly, system resource utilization rate and parallelism can be improved, and at the same time, read and write response time and system overhead are reduced.

Figure 1:
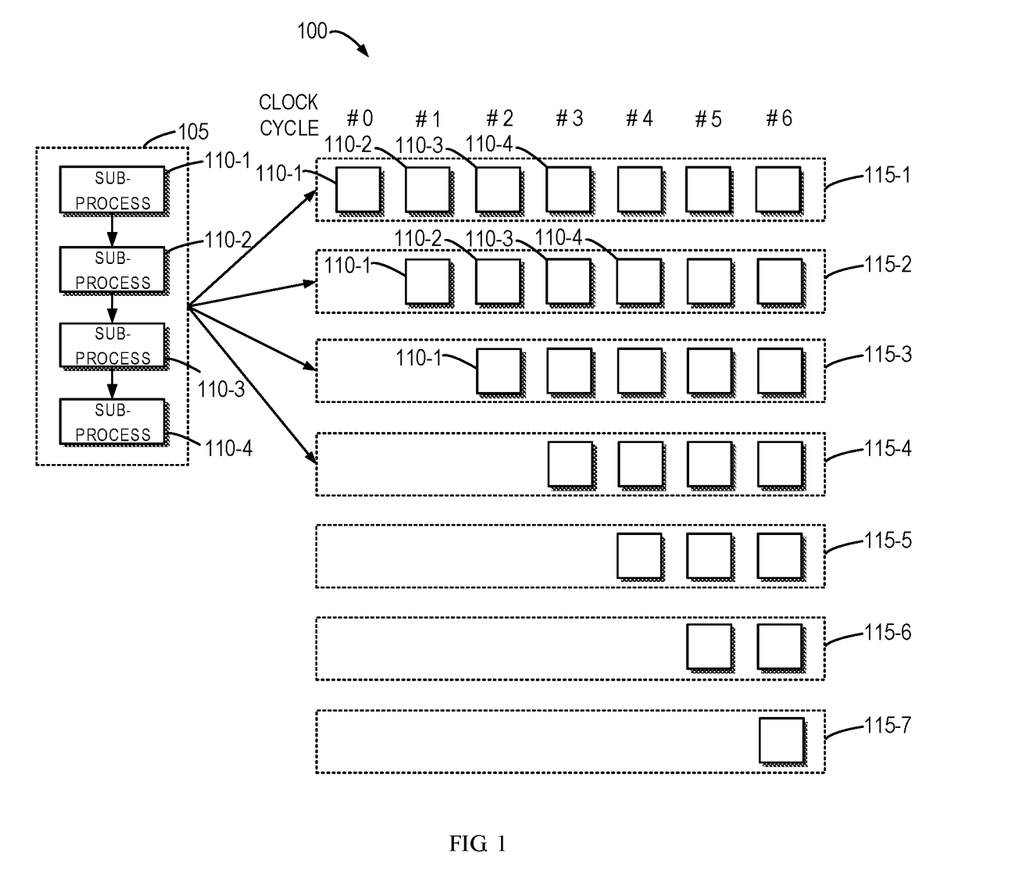
FIG. 1 illustrates an example system structure for snapshot deletion in accordance with some embodiments of the present disclosure.

FIG. 1 illustrates an example system structure 100 for snapshot deletion in accordance with some embodiments of the present disclosure. As shown in FIG. 1, a snapshot deletion process 105 is divided into a plurality of sub-processes that are performed sequentially, including sub-processes 110-1, 110-2, 110-3 and 110-4 (collectively referred to as sub-process 110). The illustrated four sub-processes 110-1, 110-2, 110-3 and 110-4 may be four different stages of snapshot deletion processing, such as a stage of reading metadata, a stage of calculating a weight value, a stage of updating block metadata (BMD) and a stage of writing a log.

It is to be understood that the implementation of dividing the snapshot deletion process 105 into other sub-processes is also feasible. It shall be further understood that the number of the sub-processes is shown in FIG. 1 only for the purpose of illustration without suggesting any limitation. Based on actual needs, the snapshot deletion process 105 may be divided into any suitable number of sub-processes.

In embodiments of the present disclosure, the snapshot deletion process 105 is allocated with a plurality of threads 115 which perform deletion of snapshot data in parallel. In some embodiments, different threads may be executed by different cores of the processing unit (such as CPU). In this way, lock contention caused by logging may be reduced and parallelism of metadata reading and writing may be increased. In some embodiments, a predetermined number of threads may be allocated to process truncated data instead of dynamically allocating threads frequently, thereby further reducing conflicts and improving resource utilization rate.

FIG. 1 illustrates seven threads 115-1 to 115-7 which are collectively referred as thread 115. Each thread 115 can perform a plurality of sub-processes 110 of the snapshot deletion process 105. For example, when snapshot data to be deleted includes a plurality of data blocks, each thread 115 may perform a sub-process 110 for a data block at a time.

The data blocks of snapshot data may be divided according to any granularity. In some embodiments, they may be divided based on the sizes of the data blocks of the snapshot logical unit number (LUN). In some other embodiments, data blocks processed by threads may be sub-divided based on finer granularity to further improve processing efficiency.

The number of sub-divided data blocks may be calculated based on size of data block size of LUN and granularity of subdivision in accordance with the following equation (1):

$$N=S/G \qquad (1);$$

where S represents the size of the data block of LUN, G represents sub-division granularity, and N stands for the number of sub-divided data blocks.

In some embodiments, a data block of 8 Mbit is taken as a basic unit of pipeline processing. A data block may include a plurality of IBs.

As illustrated in FIG. 1, the threads 115 may be scheduled by the processing unit (such as CPU) to perform the sub-processes 110-1 to 110-4 sequentially based on, for instance, a clock cycle. The time (such as time of a clock cycle) allocated by the processing unit to the thread 115 to process a task is associated with the number of IBs processed in parallel. For example, a time interval for allocating tasks may be determined based on the following equation (2):

$$T = \text{average time}(IB)/\text{SEGNUM} \qquad (2);$$

where T represents the time interval for allocating tasks, the average time (IB) denotes average processing time for a data block (for instance, including a plurality of IBs), and SEG-NUM represents the number of IBs processed in parallel. The largest number of IB data that can be processed in parallel may be equal to the number of sub-processes.

In FIG. 1, the thread 115-1 performs the sub-process 110-1 at a clock cycle #0, e.g. an operation associated with reading metadata. An example operation performed during the sub-process 110-1 is depicted below with reference to FIG. 2.

Figure 2:
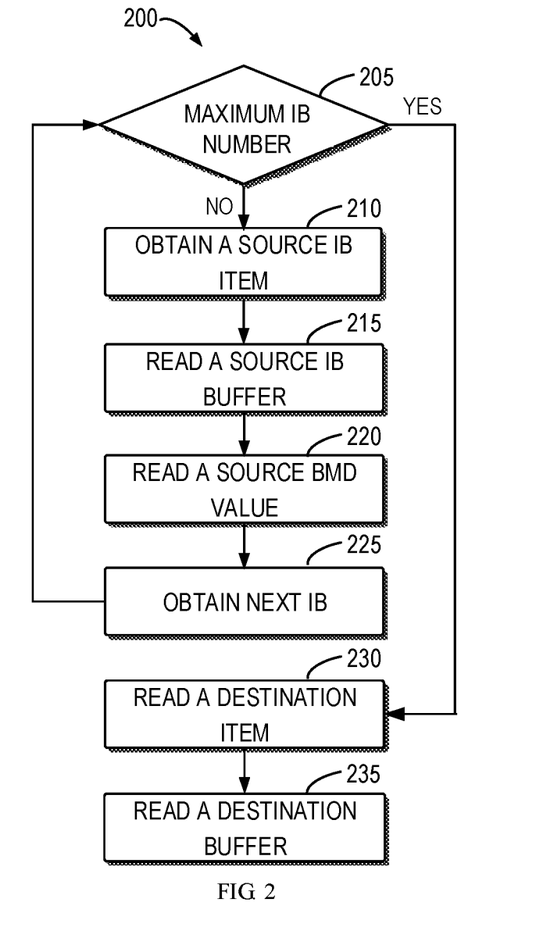
FIG. 2 illustrates an example operation of reading metadata stage during a snapshot deletion process.

As shown in FIG. 2, at block 205, it is determined whether processed IB has reached the maximum IB number. If not, a source IB item is obtained at block 210 and a source IB buffer is read at block 215. At block 220, a source BMD is read and at block 225, the next IB is obtained. Subsequently, it is returned to the block 205 and the blocks 210 to 225 is repeated until it is determined at the block 205 that the processed IB has reached the maximum IB number. Then, operation 200 proceeds to block 225 where a destination item is read. At block 235, a destination buffer is read.

Referring to FIG. 1 again, after an end of the sub-process 110-1, the thread 115-1 performs the sub-process 110-2 at clock cycle #1, such as an operation related to calculating weight value. An example operation performed during the sub-process 110-2 will be depicted below with reference to FIG. 3.

Figure 3:
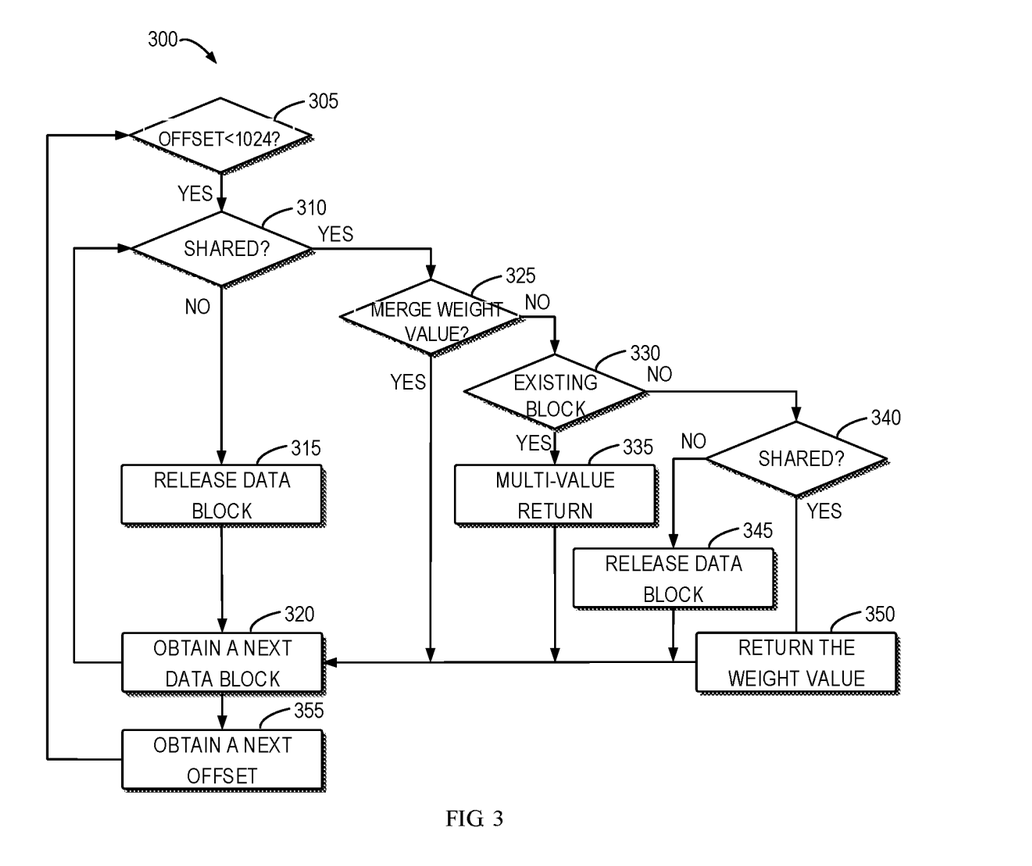
FIG. 3 illustrates an example operation of calculating weight value stage during a snapshot deletion process.

As shown in FIG. 3, at block 305, it is determined whether an offset is smaller than the maximum offset "1024". If yes, then it is determined at block 310 whether the data block is shared. If the data block is not shared, then it will be released at block 315 and the next data block is obtained at block 320. Subsequently, return to the block 310.

If it is determined at the block 310 that the data block is shared, then it is determined at block 325 whether to calculate a merged weight value. If yes, return to the block 325 and the next data block is obtained. If the merged weight value is not calculated, it is determined at the block 330 whether the data block is an existing data block. If yes, a multi-value return is performed at block 335 and return to the block 325. If the data block is not an existing data block, then it is determined at block 340 whether the data block is shared. If not, the data block is released at block 345 and return to the block 320. If the data block is shared, then a returned weight value is calculated at block 350 and return to block 320.

Next, the related processing of data block in the block 310 to block 320 described above is performed repeatedly. Until all the data blocks allocated with the same offset are processed, the next offset is obtained at block 355, and the above process performed for the previous offset is repeated until the offset reaches the maximum offset "1024".

Continuing to refer to FIG. 1, after the end of the sub-process 110-2, the thread 115-1 performs the sub-process 110-3 at clock cycle #2, such as an operation related to updating BMD. After the end of the sub-process 110-3, the thread 115-1 performs the sub-process 110-4 at clock cycle #3, such as an operation related to writing a log. An example operation performed during the sub-process 110-4 is depicted below with reference to FIG. 4.

Figure 4:
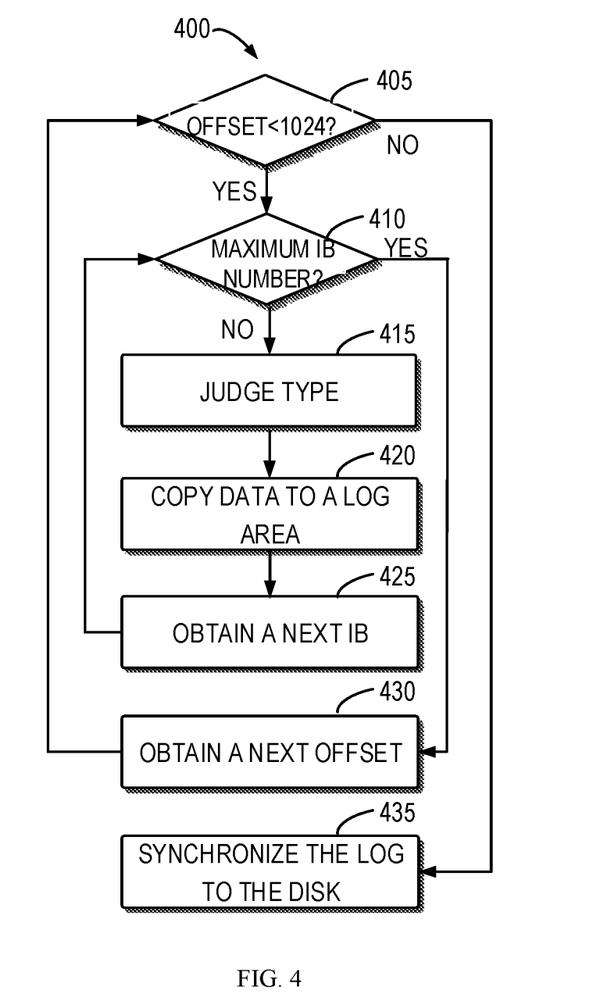
FIG. 4 illustrates an example operation of writing log stage during a snapshot deletion process.

As shown in FIG. 4, at block 405, it is determined whether the offset is smaller than the maximum offset 1024. If yes, then it is determined at block 410 if the maximum number of IBs has been processed. If the maximum number of IBs is not processed, type judgement is performed at block 415, and at block 420, data is copied to a log area based on the determined type and the next IB is obtained at block 425. Subsequently, return to the block 410 and the related processing of IB is repeated.

If it is determined at block 410 that the IBs being processed have reached the maximum IB number, then the next offset is obtained at block 430 and return to block 405 to perform the process performed for the previous offset repeatedly. Until 1024 offsets are processed, the log is synchronized to a disk at block 435.

It is to be understood that the operation processing in the sub-processes is described above only for the purpose of illustration without suggesting any limitation to the scope of the present disclosure. In an implementation, functions for describing the snapshot deletion process and operations of sub-processes thereof may be defined based on actual needs. For example, the following function arrarymultiBulkDeallocLeafIB_Pipeline may be defined to represent all the stages of a pipeline process:

```
multiBulkDeallocLeafIB_Pipeline[ ]={
NULL
multiBulkReadMetadata
calMergeOrReturnweigh
multiBulkUpdateBMD
multiBulkWriteLog
}
```

Definitions of variables in the function arrarymultiBulkDeallocLeafIB_Pipeline are shown in the following Table 1:

TABLE 1

| Function definition | Stage |
|---|---|
| multiBulkReadMetadata | Read IB metadata |
| CalMergeOrReturnweigh | Calculate merged weight value or return weight value |
| multiBulkUpdateBMD | Update BMD |
| multiBulkWriteLog | Write log |

The following function MultiBulkDeallocStage may be further defined to represent each stage of the pipeline process.

```
enumMultiBulkDeallocStage{
STAGE_READMETEDATA
STAGE_CALMRWEIGH
STAGE_UPDATEBMD
STAGE_WRITELOG
}
```

STAGE_READMETEDATA represents the stage of reading IB metadata, STAGE_CALMRWEIGH represents the stage of calculating a merged weight value or returned a weight value, STAGE_UPDATEBMD denotes the stage of updating BMD, and STAGE_WRITELOG represents the stage of writing a log.

In this way, separate functions may be used to define the strategy used in the pipeline mechanism so as to achieve separation between strategy and mechanism. Moreover, by defining strategy with functions, on one hand it is more comprehensible and on the other hand extensibility of the strategy is enhanced. For example, specific functions may be realized by adding variables and definitions.

In the following, with reference to FIG. 1 again, when the thread 115-1 performs the sub-process 110-2, the thread 115-2 performs the sub-process 110-1 in parallel. When the thread 115-1 performs the sub-process 110-3, 115-2 performs the sub-process 110-2 in parallel, and the thread 115-3 performs the sub-process 110-1 in parallel, and so on. This pipeline-based multi-thread processing can reduce lock contention, improve system resource utilization rate, and enhance performance of snapshot deletion.

In some embodiments, considering that partitioning of time interval in each stage may be not exactly the same, after the multi-thread processing is completed, for instance, the pipeline processing described above may be restarted every minute so as to facilitate timing calibration.

Figure 5:
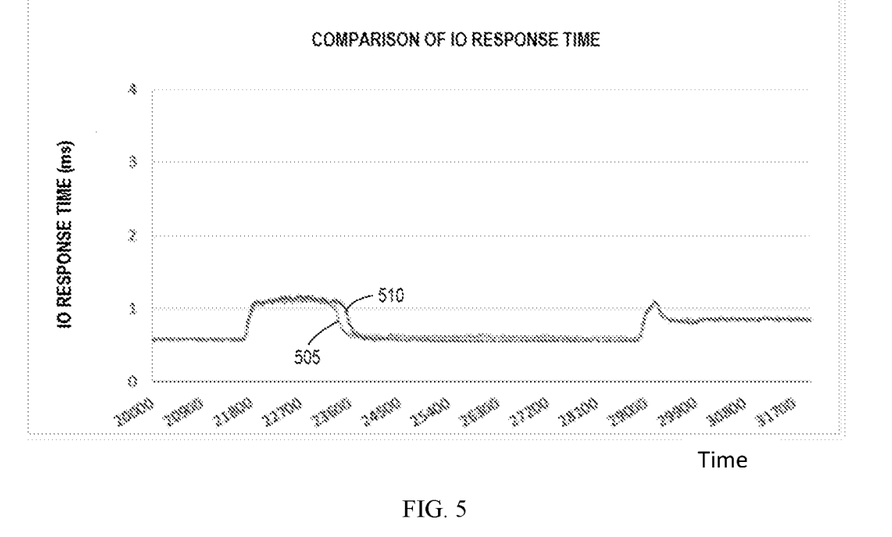
FIG. 5 illustrates a comparison of IO response time between a pipeline processing mechanism in accordance with the present disclosure and a conventional approach.
Figure 6:
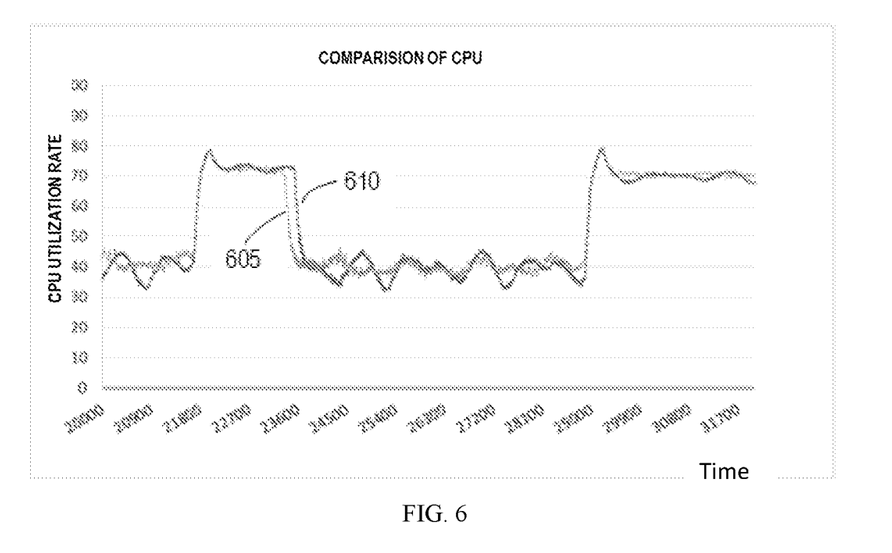
FIG. 6 illustrates a comparison of central processing unit (CPU) utilization rate between a pipeline processing mechanism in accordance with the present disclosure and a conventional approach.

By adopting the pipeline processing mechanism according to the present disclosure, the performance of snapshot deletion is enhanced significantly. FIGS. 5 and 6 illustrate comparisons of IO response time and CPU utilization rate respectively between the pipeline processing mechanism according to embodiments of the present disclosure and the conventional approach under the test environment shown in Table 2.

TABLE 2

|  | Pipeline scheduling | Conventional approach |
| --- | --- | --- |
| Protocol | FC | FC |
| Number of clients | 2 | 2 |
| Number of ports | 2 FC ports | 2 FC ports |
| IOPS | 10085.082 | 10066.731 |
| Number of tools | 1 | 1 |
| Number of drivers | 65600G RAID5 (4 + 1) 31.2TB HDD + 9200G RAID5 (8 + 1) 1.6TB SSD ==> total valid 32.8TB | 65600G RAID5 (4 + 1) 31.2TB HDD + 9200G RAID5 (8 + 1) 1.6TB SSD ==> total valid 32.8TB |
| Number of LUNs | 50 | 50 |
| LUN type DLU/TLU | TLU | TLU |
| Nominal LUN size (GB) | 100 | 100 |
| Other system setting | FastVP disabled | FastVP disabled |
| Total number of data blocks | 2 | 2 |
| Time interval of data blocks (second) | 1800 (0.5 hour) | 1800 (0.5 hour) |

In FIG. 5, a curve 505 represents the IO response time of the pipeline processing mechanism and a curve 510 represents the IO response time of the conventional approach. As shown in FIG. 5, the curve of the IO response time of the pipeline processing mechanism is smoother. Besides, when the response time is the same, the total truncation time of the pipeline processing mechanism is shorter.

In FIG. 6, a curve 605 represents CPU utilization rate of the pipeline processing mechanism, and a curve 610 represents the CPU utilization rate of the conventional approach. As shown in FIG. 6, when the CPU utilization rate is the same, the total truncation time of the pipeline processing mechanism is shorter.

In this test, with the pipeline processing mechanism according to the embodiments of the present disclosure, the performance of snapshot deletion is improved by 8-10%.

Figure 7:
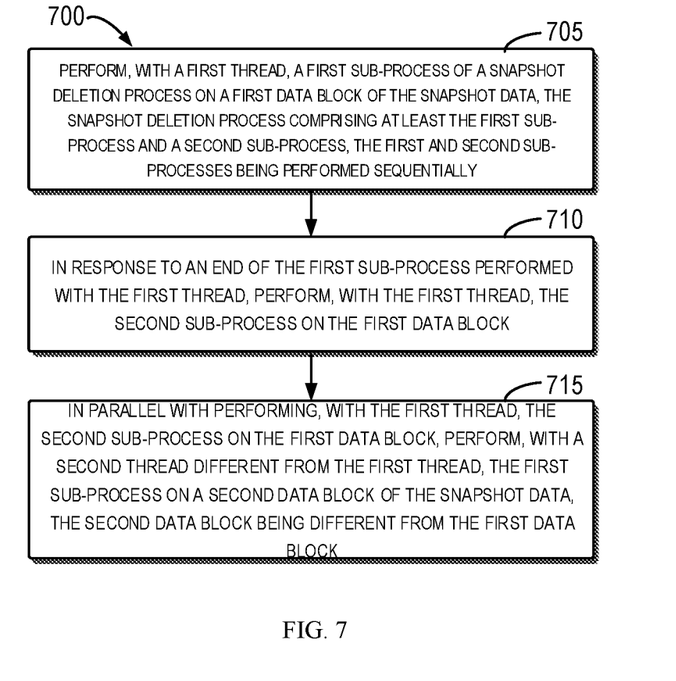
FIG. 7 is a flowchart illustrating a method in accordance with some embodiments of the present disclosure.

FIG. 7 is a flowchart illustrating an example method 700 in accordance with some embodiments of the present disclosure. The method 700 may be implemented in the system structure 100 shown in FIG. 1.

As illustrated, at block 705, a thread (referred to as "first thread") is used to perform a sub-process (referred to as "a first sub-process") of a snapshot deletion process for a data block (referred to as "a first data block") of snapshot data. The snapshot deletion process includes at least a first sub-process and another sub-process (referred to as "a second sub-process"), the first sub-process and the second sub-process being performed sequentially. At block 710, in response to an end of the first sub-process performed using the first thread, the first thread is utilized to perform the second sub-process on the first data block. At block 715, in parallel with performing the second sub-process on the first data block with the first thread, another thread (referred to as "a second thread") different from the first thread is utilized to perform the first sub-process for another data block (referred to as "a second data block") of the snapshot data different from the first data block.

In some embodiments, the method 700 may further include: in response to an end of the first sub-process performed using the second thread, performing the second sub-process on the second data block using the second thread. Moreover, in parallel with performing the second sub-process on the second data block using the second thread, another thread (referred to as "a third thread") different from the second thread is utilized to perform the first sub-process for another data block (referred to as "a third data block") of the snapshot data. The third data block is different from the first and the second data blocks and the third thread may be the same or not the same as the first thread.

In some embodiments, the method 700 may further include: allocating a predetermined number of threads to delete snapshot data. The predetermined number of threads includes at least the first and second threads.

In some embodiments, the first thread is executed by a core (referred to as "a first core") of the processing unit, and the second thread is executed by another core (referred to as "a second core") of the processing unit different from the first core.

It is to be understood that the operations and the associated features described above with reference to FIGS. 1-6 are also applicable to the method 700 and have the same effects, and the specific details will not be repeated here.

Figure 8:
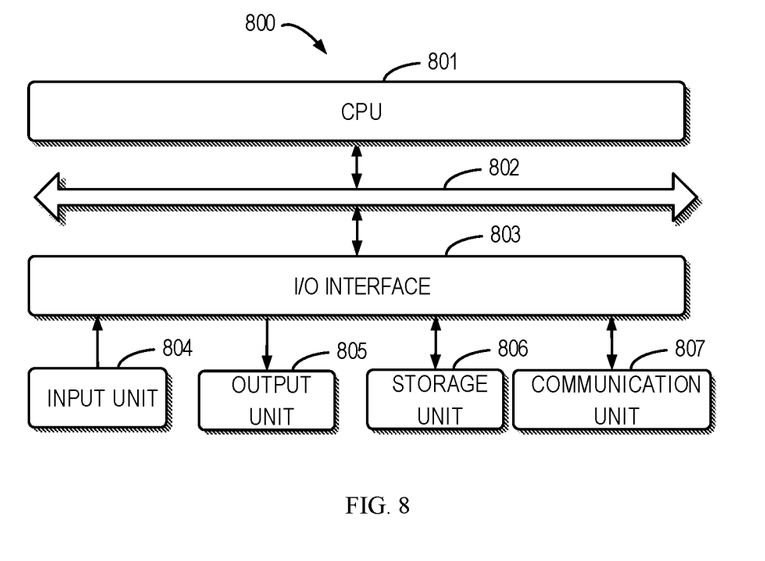
FIG. 8 is a block diagram illustrating a device suitable for implementing embodiments of the present disclosure.

FIG. 8 illustrates a schematic block diagram of a device 800 that may be used to implement embodiments of the present disclosure. As shown in FIG. 8, the device 800 includes a controller or a processor, or referred to as a central processing unit (CPU) 801 which can execute various appropriate actions and processing based on computer program instructions stored in a read-only memory (ROM) 802 and/or the computer program instructions loaded into a random access memory (RAM) 803. The ROM 802 and/or RAM 803 may store all kinds of programs and data required by operating the storage device 800. The CPU 801, ROM 802 and RAM 803 are connected to each other via a bus 804. Particularly, the device 800 may further include one or more dedicated processing units (not shown) which can be connected to a bus 804.

An input/output (I/O) interface 805 is also connected to the bus 804. A plurality of components in the device 800 are connected to the I/O interface 805, including: an input unit 806, such as a keyboard, a mouse and the like; an output unit 807, such as various types of displays, loudspeakers and the like; a storage unit 808, such as a magnetic disk, an optical disk and the like; and a communication unit 809, such as a network card, modem, a wireless communication transceiver and the like. The communication unit 809 allows the device 800 to exchange information/data with other devices through computer networks such as Internet and/or various telecommunication networks. In particular, in the embodiments of the present disclosure, the communication unit 809 supports communication with a client or other devices.

In some embodiments, the CPU 801 may be configured to perform various processes or processing described above, such as the method 700. For example, in some embodiments, the method 700 can be implemented as computer software programs, which are tangibly included in a machine-readable medium, such as the storage unit 808. In some embodiments, the computer program can be partially or completely loaded and/or installed to the device 800 via the ROM 802 and/or the communication unit 809. When the computer program is loaded to the RAM 803 and executed by the CPU 801, one or more steps of the above described method 700 are implemented. Alternatively, in other embodiments, the CPU 801 may also be configured to implement the above process/method in any other suitable manners.

Particularly, according to the embodiments of the present disclosure, the process described above with reference to FIGS. 1-6 may be implemented as a computer program product which may be tangibly stored on a non-transient computer readable storage medium and includes computer-executable instructions, the instructions, when executed, causing the device to implement various aspects of the present disclosure.

The computer readable storage medium can be a tangible device that can retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination thereof. More specific examples (a non-exhaustive list) of the computer readable storage medium would include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination thereof. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, by means of state information of the computer readable program instructions, an electronic circuitry including, for example, programmable logic circuitry, field-programmable gate arrays (FPGA), or programmable logic arrays (PLA) can be personalized to execute the computer readable program instructions, thereby implementing various aspects of the present disclosure. Aspects of the present disclosure are described herein with reference to flowchart and/or block diagrams of methods, apparatus (systems), and computer program products according to embodiments of the present disclosure. It is to be understood that each block of the block diagrams and/or flowchart illustrations, and combinations of blocks in the block diagrams and/or flowchart illustrations, can be implemented by computer readable program instructions.

The descriptions of the various embodiments of the present disclosure have been presented for illustration purposes, but are not intended to be exhaustive or limited to the embodiments disclosed. All modifications and variations shall fall under the scope of protection of the present disclosure and/or defined by the claims without departing from the essence of the present disclosure.

We claim:

1. A method of deleting snapshot data using a snapshot deletion process that includes multiple sub-processes arranged for execution in a pipeline, comprising:
  performing, with a first thread, a first sub-process of the snapshot deletion process on a first data block of the snapshot data, the snapshot deletion process comprising at least the first sub-process and a second sub-process, the first and second sub-processes being performed sequentially;
  in response to an end of the first sub-process performed with the first thread, performing, with the first thread, the second sub-process on the first data block; and
  in parallel with performing, with the first thread, the second sub-process on the first data block, performing, with a second thread different from the first thread, the first sub-process on a second data block of the snapshot data, the second data block being different from the first data block,
  the snapshot deletion process proceeding with multiple threads operating on respective blocks in parallel and with different ones of the threads performing different sub-processes at a same time, thereby avoiding I/O (Input/Output) lock contention,
wherein the multiple sub-processes include a stage of calculating a weight value to be merged or returned when deleting the data block and a stage of updating block metadata (BMD) of the data block, wherein the weight value, which tracks sharing among blocks, is merged responsive to a determination to calculate a merged weight value and is returned responsive to the block being shared and there being no existing block.

2. The method according to claim 1, further comprising:
in response to an end of the first sub-process performed with the second thread, performing, with the second thread, the second sub-process on the second data block; and
in parallel with performing, with the second thread, the second sub-process on the second data block, performing, with a third thread different from the second thread, the first sub-process on a third data block of the snapshot data, the third data block being different from the first and second data blocks.

3. The method according to claim 2, wherein the third thread is different from the first thread.

4. The method according to claim 1, further comprising:
allocating a predetermined number of threads to delete the snapshot data, the predetermined number of threads comprising at least the first thread and the second thread.

5. The method according to claim 1, wherein the first thread is executed by a first core of a processing unit, and the second thread is executed by a second core of the processing unit, the first core being different from the second core.

6. The method of claim 1, wherein the multiple sub-processes further include:
a stage of reading metadata of a data block being processed; and
a stage of writing a log that records the update to the block metadata.

7. The method of claim 1, wherein performing different sub-processes at the same time with different ones of the threads includes performing no one sub-process by more than one of the threads at the same time.

8. A device for deleting snapshot data, comprising:
a processor; and
a memory storing computer-executable instructions which, the instructions, when executed by the processor, causing the device to perform a method of deleting snapshot data using a snapshot deletion process that includes multiple sub-processes arranged for execution in a pipeline, the method comprising:
performing, with a first thread, a first sub-process of a snapshot deletion process on a first data block of the snapshot data, the snapshot deletion process comprising at least the first sub-process and a second sub-process, the first and second sub-processes being performed sequentially;
in response to an end of the first sub-process performed with the first thread, performing, with the first thread, the second sub-process on the first data block; and
in parallel with performing, with the first thread, the second sub-process on the first data block, performing, with a second thread different from the first thread, the first sub-process on a second data block of the snapshot data, the second data block being different from the first data block,
the snapshot deletion process proceeding with multiple threads operating on respective blocks in parallel and with different ones of the threads performing different sub-processes at a same time, thereby avoiding I/O (Input/Output) lock contention,
wherein the multiple sub-processes include a stage of calculating a weight value to be merged or returned when deleting the data block and a stage of updating block metadata (BMD) of the data block, wherein the weight value, which tracks sharing among blocks, is merged responsive to a determination to calculate a merged weight value.

9. The device according to claim 6, wherein the method further comprises:
in response to an end of the first sub-process performed with the second thread, performing, with the second thread, the second sub-process on the second data block; and
in parallel with performing, with the second thread, the second sub-process on the second data block, performing, with a third thread different from the second thread, the first sub-process on a third data block of the snapshot data, the third data block being different from the first and second data blocks.

10. The device according to claim 9, wherein the third thread is different from the first thread.

11. The device according to claim 8, wherein the method further comprises:
allocating a predetermined number of threads to delete the snapshot data, the predetermined number of threads comprising at least the first thread and the second thread.

12. The device according to claim 8, wherein the first thread is executed by a first core of a processing unit, and the second thread is executed by a second core of the processing unit, the first core being different from the second core.

13. A method of deleting snapshot data, comprising:
allocating multiple threads;
assigning the threads to respective blocks, the threads configured to perform a snapshot deletion process on the respective blocks, the snapshot deletion process including multiple pipelined sub-processes arranged for execution during sequential processing cycles;
initiating the snapshot deletion process by the respective threads on different processing cycles, the threads then independently performing the sub-processes on the respective blocks in a parallel arrangement that performs different sub-processes by different threads and avoids I/O (Input/Output) lock contention,
wherein the multiple sub-processes include a stage of calculating a weight value to be merged or returned when deleting the data block and a stage of updating block metadata (BMD) of the data block, wherein the weight value, which tracks sharing among blocks, is returned responsive to the block being shared and there being no existing block.

14. The method of claim 13, further comprising executing the threads on respective cores of a processing unit.

15. The method of claim 13, wherein the multiple sub-processes include:
a stage of reading metadata of a data block being processed; and
a stage of writing a log that records the update to the block metadata.

* * * * *